(12) United States Patent
Li et al.

(10) Patent No.: US 11,221,473 B2
(45) Date of Patent: Jan. 11, 2022

(54) PULSE-ILLUMINATED EDGE DEDUCTION MICROSCOPY

(71) Applicant: CLEMSON UNIVERSITY, Clemson, SC (US)

(72) Inventors: Yang Li, Clemson, SC (US); Tong Ye, Clemson, SC (US); Xun Chen, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 164 days.

(21) Appl. No.: 16/499,952

(22) PCT Filed: Mar. 5, 2018

(86) PCT No.: PCT/US2018/020836
§ 371 (c)(1),
(2) Date: Oct. 1, 2019

(87) PCT Pub. No.: WO2018/186960
PCT Pub. Date: Oct. 11, 2018

(65) Prior Publication Data
US 2021/0132353 A1   May 6, 2021

Related U.S. Application Data

(60) Provisional application No. 62/482,251, filed on Apr. 6, 2017.

(51) Int. Cl.
*G02B 21/06* (2006.01)
*G02B 21/00* (2006.01)
*G01N 21/64* (2006.01)

(52) U.S. Cl.
CPC ..... *G02B 21/0076* (2013.01); *G01N 21/6458* (2013.01); *G02B 21/0032* (2013.01); *G02B 21/0072* (2013.01)

(58) Field of Classification Search
CPC ............ G02B 21/0076; G02B 21/0032; G02B 21/0072; G02B 21/00; G02B 21/0004;
(Continued)

(56) References Cited

U.S. PATENT DOCUMENTS 5,844,598 A    12/1998  Janesick
6,667,830 B1 * 12/2003  Iketaki ................. G01N 21/636
                                                   250/458.1
(Continued)

OTHER PUBLICATIONS

Bates, et al. "Stochastic optical reconstruction microscopy (STORM): A method for superresolution fluorescence imaging" *Cold Spring Harb. Protoc.* (2013) pp. 498-520.
(Continued)

*Primary Examiner* — Arnel C Lavarias
(74) *Attorney, Agent, or Firm* — Dority & Manning, P.A.

(57) ABSTRACT

Devices and methods for super-resolution optical microscopy are described. Devices include an optical multiplexer to develop an excitation/illumination optical beam that includes alternating pulses of different profiles. Devices also include a signal processing unit to process a sample response to excitation/illumination beam and to subtract the neighboring pulses of the different profiles from one another on a pulse-to-pulse basis. Devices can be incorporated in existing confocal microscopy designs. As the subtraction effectively reduces the volume of the response signal, the spatial resolution of the systems can be markedly improved as compared to previously known optical microscopy approaches.

20 Claims, 2 Drawing Sheets

(58) Field of Classification Search
CPC .............. G02B 21/002; G02B 21/0024; G02B 21/0052; G02B 21/008; G02B 21/0084; G02B 21/06; G02B 21/18; G02B 21/36; G02B 21/361; G02B 21/365; G02B 21/367; G02B 27/0927; G02B 27/10; G02B 27/106; G02B 27/1066; G02B 27/14; G02B 17/023; G01N 21/6458; G01N 21/6456

USPC ....... 359/385, 362, 363, 368, 369, 388, 390, 359/618, 629, 638

See application file for complete search history.

(56) References Cited

U.S. PATENT DOCUMENTS

| | | | |
|---|---|---|---|
| 6,844,963 B2 | 1/2005 | Iketaki et al. | |
| 2002/0167724 A1* | 11/2002 | Iketaki | G02B 21/06 359/385 |
| 2007/0176814 A1 | 8/2007 | Grace | |
| 2013/0027774 A1 | 1/2013 | Bovino et al. | |
| 2015/0103352 A1 | 4/2015 | Matsuzaki et al. | |

OTHER PUBLICATIONS

Hell, et al. "Breaking the diffraction resolution limit by stimulated emission: stimulated-emission-depletion fluorescence microscopy" *Opt. Lett.* 19(11) (1994) pp. 780-782.

Korobchevskaya, et al. "Intensity weighted subtraction microscopy approach for image contrast and resolution enhancement" *Sci. Rep.* 6:25816 (2016) pp. 1-9.

Kuang, et al. "Breaking the diffraction barrier using fluorescence emission difference microscopy" *Sci. Rep.* 3:1441 (2013) pp. 1-6.

Sengupta, et al. "Superresolution imaging of biological systems using photoactivated localization microscopy" *Chem. Rev.* 114(6) (2014) pp. 3189-3202.

Wang, et al. "Subtraction threshold for an isotropic fluorescence emission difference microscope" *J. Optics* 17:125302 (2015) pp. 1-8.

Wang, et al. "Numerical calibration of the spatial overlap for subtraction microscopy" *Optics Expr.* 23(10) (2015) pp. 13410-13422.

International Searching Authority. "International Search Report and Written Opinion" PCT/US2018/020836 (May 30, 2018) pp. 1-10.

Davis, et al. "Four-focus single-particle position determination in a confocal microscope" *Proc. SPIE.* 7571:757112 (2010) pp. 1-10.

Wang, et al. "Sub-diffraction-limit nnaging using mode multiplexing" *Opt. Comm.* 343 (2015) pp. 28-33.

You, et al. "Three-dimensional super-resolution imaging for fluorescence emission difference microscopy" *AIP Adv.* 5:084901 (2015) pp. 1-10.

Zhao, et al. "Super resolution microscopy by dual-model competition excitation" *Imag. Appl. Opt. Cong.* JT3A.60 (2016) pp. 1-3.

\* cited by examiner

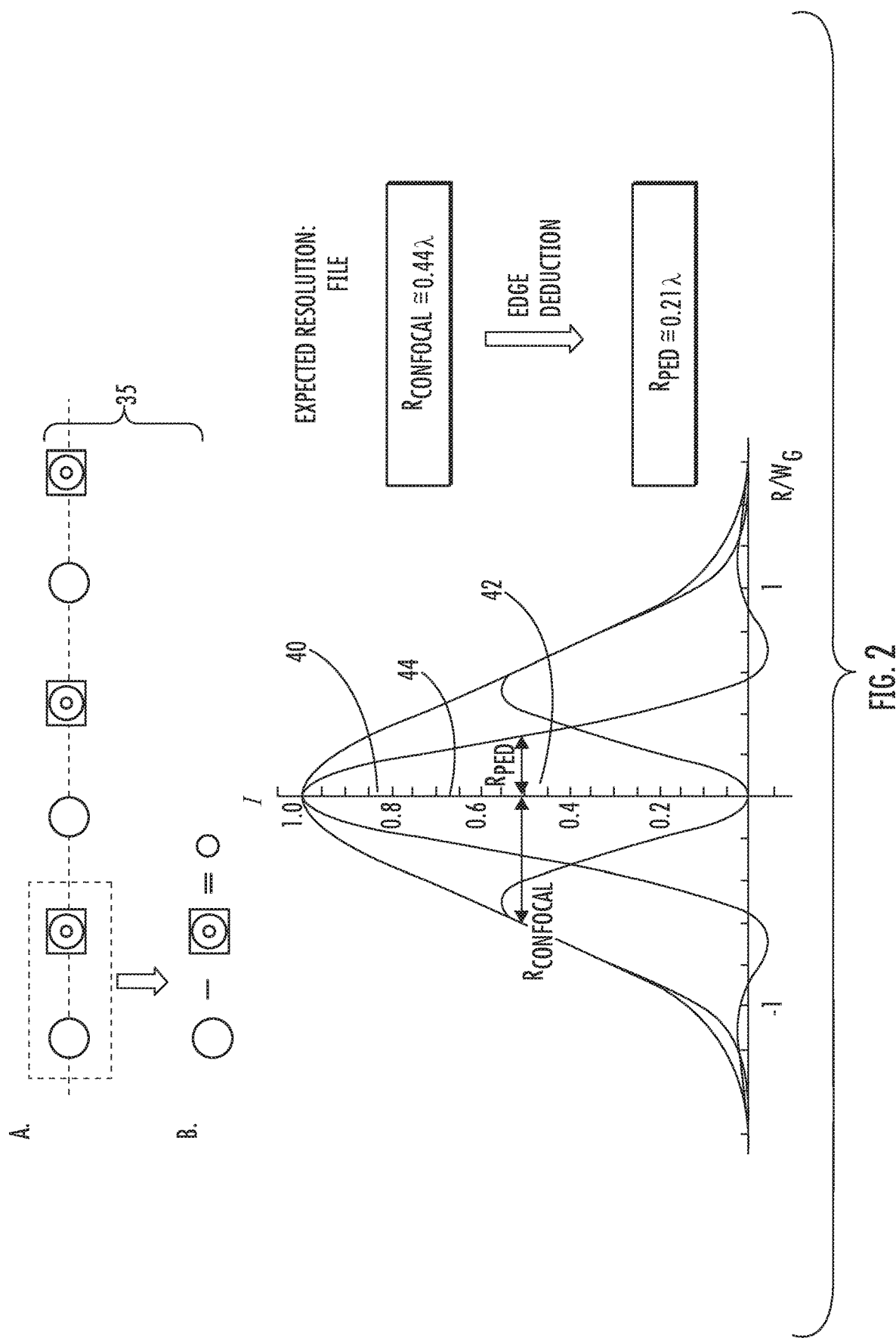

PULSE-ILLUMINATED EDGE DEDUCTION MICROSCOPY

CROSS REFERENCE TO RELATED APPLICATION

This application is the U.S. national stage entry of International Application No. PCT/US2018/020836, having a filing date of Mar. 5, 2018, which claims filing benefit of U.S. Provisional Patent Application Ser. No. 62/482,251, having a filing date of Apr. 6, 2017, entitled "Pulse-illuminated Edge Deduction (PED) Microscopy," both of which are incorporated herein by reference for all purposes.

GOVERNMENT SUPPORT CLAUSE

This invention was made with government support under Grant #5P20GM103499-16, awarded by National Institutes of Health. The government has certain rights in the invention.

BACKGROUND

Optical microscopy is an indispensable tool in biological research and is the preferred way to study cellular structure-function relationships in real time on live tissue in the native biological environment. However, its spatial resolution is limited by light diffraction and it cannot meet increasing needs in modern biological research, where molecular structure and function is sought to be elucidated by high-resolution imaging. For example, commonly used laser scanning confocal microscopy has a spatial resolution that is determined by light diffraction at $$R \gtrsim \frac{0.61\lambda}{N.A.},$$

where $\Delta$ is the illumination light wavelength and N.A. is the numerical aperture of the objective lens. Typically, confocal microscopes work at the resolution of about 250 nm, which is not sufficient in many applications.

The past two decades have seen major advances in development of super-resolution microscopy that overcomes the diffraction limit, including STED (Stimulated Emission Depletion), PALM (Photo-Activated Localization Microscopy), and STORM (STochastic Optical Reconstruction Microscopy). However, these approaches all have less than ideal requirements such as the need for high irradiation dose, requirements for multiple lasers, the need for special dyes, slow temporal resolution and complicated or costly sample pre-treatments.

Among these approaches, STED exhibits good potential for biological imaging not only because of its high temporal and spatial resolution (30-80 nm), but also because of its capability of achieving super-resolution imaging without post-processing and its applicability to thick samples. However, STED has not been widely applied in biological studies due primarily to the following limitations: a) The high spatial resolution is achieved by using relatively high laser power, which may cause damage of biological samples; b) there are limited choices of dyes that provide the necessary high depletion efficiency; and c) there are limited choices of lasers because two lasers at different wavelengths have to be specifically chosen to meet spectral properties of the dyes used in STED. Such issues take on even more prominence when imaging living cells or tissues and make STED microscopy difficult at best for use in imaging living samples.

Another optical microscopy method that has been proposed to address resolution issues is termed Fluorescence Emission Difference (FED) Microscopy. FED scans a sample twice with two differently profiled laser beams and performs a subtraction between the two acquired frames. Unfortunately, FED has relatively low temporal resolution and deteriorated spatial resolution due to its frame-to-frame subtraction. Moreover, FED requires that a sample remain very stable and essentially identical in the time period between the acquisition of neighboring frames, which is difficult to achieve, especially in live cell imaging. Another difficulty of FED is the introduction of empirical factors for subtractions used to improve the image quality. Choosing the factors is complicated and may introduce artifacts to the final images.

What is needed in the art is an approach to super-resolution optical microscopy that addresses these and other issues of previously developed approaches.

SUMMARY

According to one embodiment, disclosed is an optical microscopy device that includes an optical multiplexer that is configured for use in conjunction with a confocal microscope. For instance, the multiplexer can be an add-on feature to an existing confocal microscope or can be an integral portion of a confocal microscope. The optical multiplexer can include beam splitter and a beam combiner. A first light path and a second light path are defined between the beam splitter and the beam combiner, and the beam combiner is configured for location in optical communication with a sample to be examined by use of the device, i.e., a sample held by a confocal microscope. The first and second light paths are configured (e.g., via a difference in length) such that a first pulsed beam traveling on the first light path and a second pulsed beam traveling on the second light path are out of phase with one another at the beam combiner. An optical multiplexer can also include a phase plate, e.g., an optical vortex phase plate, in one of the first and second light paths that modifies the profile of a light beam traveling on that path.

A device can also include a signal processing unit that is configured to process the response of a sample to an optical excitation developed by the multiplexer. The signal processor can be located downstream of the photodetector of a confocal microscope. For instance, the signal processor can include a demultiplexer that separates two signals of a sample response, an analog to digital converter, and data processing software configured to deduct adjacent components of the sample response from one another following the demultiplexing. The signal processor can also form an image of a sample by use of the resulting processed signal.

Also disclosed is a method for examining a sample. For example, a method can include directing a pulsed source light beam to a beam splitter to form a first pulsed beam and a second pulsed beam traveling on first and second light paths, respectively. While traveling on the first path, the profile of the first pulsed beam is modified, for instance by passage through an optical vortex phase plate. At the beam combiner, the first and second pulsed beams, which are now out of phase with one another, are multiplexed to form a third pulsed beam that includes the different profiles of the first and second pulsed beams interleaved with one another. This third pulsed beam is directed at a sample, thereby forming a response pulsed beam. A detector can detect and convert this response pulsed beam into an electrical signal. This electrical signal can then be demultiplexed allowing for adjacent components of the electrical signal to be deducted from one another to form a processed signal. This resulting processed signal can then be used to form an image of the sample.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 2 graphically illustrates the results of signal processing an interleaved response signal as described herein Repeat use of reference characters in the present specification and drawings is intended to represent the same or analogous features or elements of the present invention.

DETAILED DESCRIPTION

Figure 1:
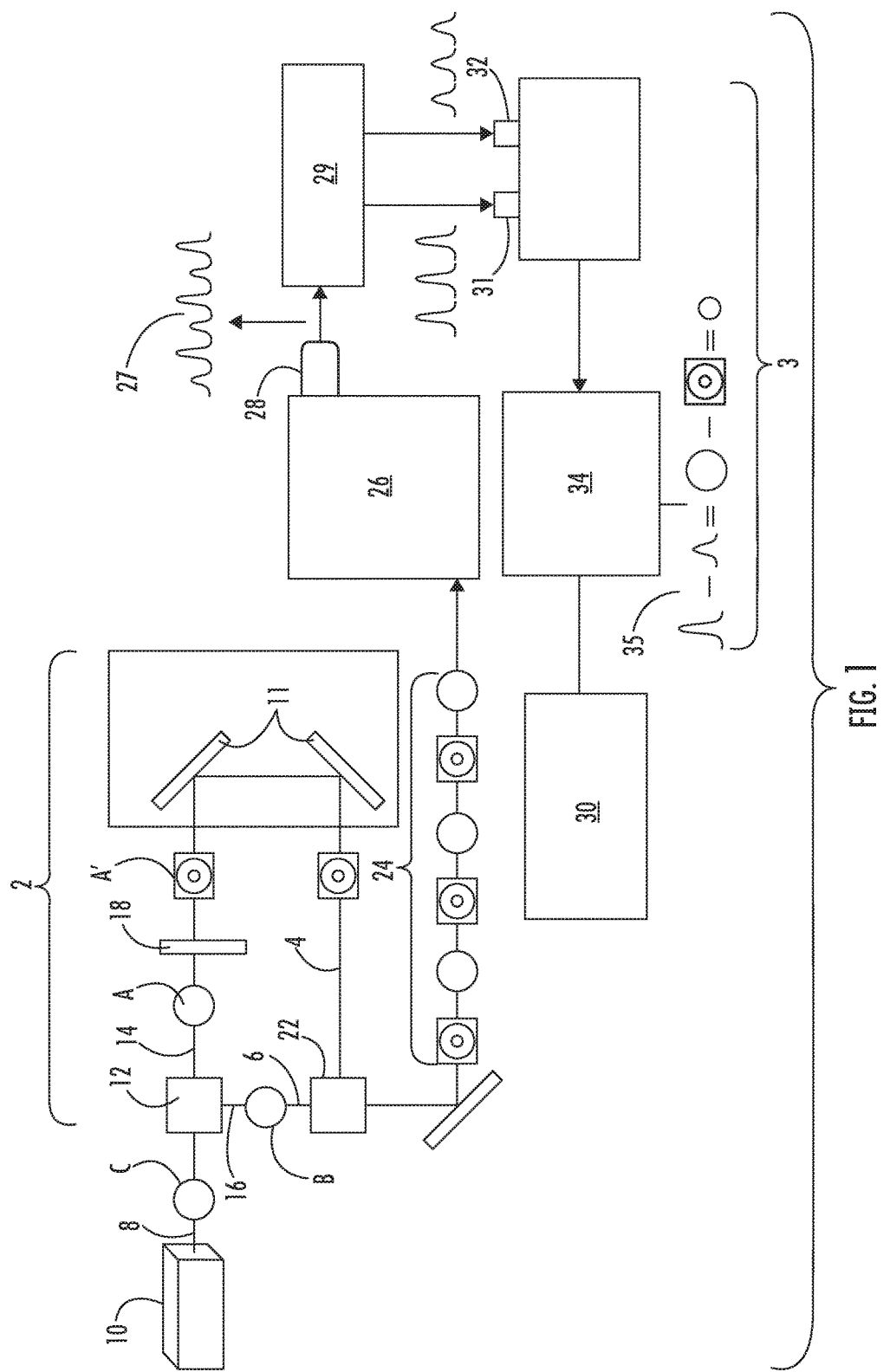
FIG. 1 schematically illustrates a pulse-illuminated edge deduction super-resolution microscopy system as described herein.

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are devices and methods for super-resolution optical microscopy. More specifically, disclosed devices develop an optical beam that includes alternating pulses of different profiles and then process the resulting sample response signal to subtract the neighboring signals of the different profiles from one another on a pulse-to-pulse basis. As the subtraction effectively reduces the volume of the response signal, the spatial resolution of the systems can be markedly improved as compared to previously known optical microscopy approaches.

Beneficially, disclosed systems require only one laser at a single wavelength, and high intensity laser illumination is not required as is the case for other systems such as STED. Moreover, while samples to be imaged can be pre-treated with a dye, this is not a requirement, and an excitation source can be selected to maximize auto-fluorescence of a sample with no dye addition required. As pulsed lasers of different wavelengths are widely available and use of the devices can include little or no pho-toxicity or cell damage; the breadth of applicability of disclosed devices can be greatly increased as compared to previously known optical microscopy systems. In addition, spatial resolution of disclosed systems can be on the order of about 120 nm or even less, as compared to about 250 nm for confocal microscopy systems. Thus, disclosed devices can provide low cost and highly effective super-resolution optical microscopy that is highly versatile and that can be widely used in one particular embodiment in biological research.

FIG. 1 schematically illustrates one embodiment of a system that can incorporate disclosed devices. A technical feature of disclosed devices is formation of an excitation/illumination pulse train that is composed of two interleaved profiles of laser pulses. To engineer such a pulse train, a pulsed light source 10 (e.g., a pulsed optical laser) is utilized. The pulsed light source emits a pulsed source light beam 8 of a desired wavelength. While the electromagnetic beams are generally referred to as light beams throughout this disclosure, it should be understood that wavelengths found in use of disclosed systems are not limited to visible light (i.e., about 400 nm to about 700 nm), and in some embodiments, wavelengths outside of the visible range can be generated or detected in use of the systems. For instance, in one embodiment, a pulsed source can emit a pulsed source light beam in a wavelength range of from the ultraviolet to the infrared, for instance, from about 10 nm to about 1000 nm.

The pulsed source 10 can emit a pulsed source light beam 8 having pulse durations on the order of picoseconds, e.g., having pulse durations of about 50 picoseconds or more, for instance from about 50 picoseconds to about 100 picoseconds, or from about 1 picosecond to about 1 nanosecond, in some embodiments. In addition, the repetition rate of the pulsed source 10 can generally be relatively high, for instance the pulsed source 10 can generate a pulsed source light beam having a repetition rate of about 10 MHz or greater (i.e., about 10 million pulses per second or greater), or from about 10 MHz to about 100 MHz in some embodiments.

The pulsed source light beam 8 can have a known profile; for instance, it can be Gaussian profile beam that focuses to a solid spot. Following emission, the pulsed source light beam 8 can be directed to an optical multiplexer 2. The optical multiplexer 2 includes a beam splitter 12, at which location every pulse of the pulsed source light beam 8 can be split into two individual pulses forming a first pulsed beam 14 and a second pulsed beam 16 that travel independently along first and second light paths 4, 6 as shown. The beam splitter 12 can comprise a half-wave plate and polarizing beam splitter having an adjustable reflecting ratio of the order of 5-95%. In one embodiment, the beam splitter 12 can have a reflecting ratio of about 50%. By use of a 50/50 type beam splitter, the first and second pulsed beams 14, 16 can be essentially equal in power, but this is not a requirement of a system.

The first path 4 and the second path 6 are designed such that the two individual pulses created by the splitting of a single pulse of beam 8 at the beam splitter 12 (e.g., pulse A and pulse B co-created by the splitting of pulse C at the beam splitter 12) travel different distances between the beam splitter 12 and the beam combiner 22. This causes the pulse in one of the beams (e.g., pulse A in beam 14 in the illustrated embodiment) to arrive at a beam combiner 22 with a temporal delay as compared to the pulse of beam 16 (pulse B) that was co-created with pulse A at the splitting of pulse C. In one embodiment, the delay between split pulses (e.g., pulses A and B) in the first and second pulsed beams 14, 16 can be adjusted through modification of the relative path lengths, for instance by use of one or more reflecting mirrors 11. The additional length of the longer of the two paths, (first light path 4 in the illustrated embodiment) can set a temporal delay in the pulses of the pulsed beam 14 carried on that path due to the differential length of the path 4 as compared to the path 6. By way of example, if the pulsed source light beam 8 is a 40 MHz pulsed laser output, the cycle time is 25 nanoseconds. Thus, in order to obtain a delay of 12.5 nanoseconds, the first pulsed beam 14 should travel 3.75 meters longer along the first beam path 4 than the second beam path 6. This additional length can provide that the co-created pulses A and B are off-set by about one-half of a pulse repetition cycle from one another at the beam combiner 22.

In one embodiment, the length differential between the two path 4, 6 can be adjustable, so as to accurately and evenly shift the co-created pulses of the first and second pulsed beams 14, 16 with respect to one another using a source light beam 8 of any desired characteristics (e.g., repetition rate).

In one of the two paths, the profile of the initial source light beam 8 is modified to develop a different profile for the beam passing down that path. For instance, a phase plate 18 can be used to modify the profile of the individual pulses A of first pulsed beam 14 to define a different pulse profile A'. A phase plate 18 can generally include any optical phase modulation device as is known in the art including, without limitation, an optical vortex phase plate, a spatial light modulator, or combinations of devices. By way of example, in one embodiment the pulsed source light beam 8 can have a typical pulse profile in which the pulses define a profile that focuses to a solid spot, e.g., a Gaussian profile or a Bessel profile. Following splitting, the profile of the pulse A (e.g., a Gaussian profile pulse) can be modified by use of an optical vortex phase plate 18 to form a modified pulse A', which focuses to a doughnut-shaped light field, e.g., a Laguerre-Gaussian profile. Suitable phase plates for modification of the profile of a light beam are known, for instance as available from HOLO/OR, Ltd., and as described in U.S. Patent Application Publication No. 2013/0027774 to Bovino, et al., which is incorporated herein by reference. For instance, doughnut-shaped beams including a circular profile surrounding a dark center can be described by other functions, in addition to a Laguerre-Gaussian profile, and these as well as other profile functions are encompassed herein.

Upon the profile modification, the phase-shifted first pulsed beam 14 and second pulsed beam 16 proceed to a beam combiner 22, where they are combined to form a single pulsed excitation/illumination light beam 24. Due to the delay set by the differential length of the first pulsed beam 14, at the beam combiner 22, the repetition rate of the pulse light beam 24 will be twice of the repetition rate of the laser output 10. For example, if the laser output pulses a source light beam 8 at 80 MHz, the pulsed excitation/illumination light beam 24 will be at 160 MHz.

In addition, because the individual pulses of the first and second pulsed beams 14 and 16 are shifted with respect to one another, the excitation light beam 24 can include the pulses of the first and second pulsed beams 14, 16 interleaved with one another. For instance, in the illustrated example of a pulsed beam 16 formed of a series of pulses B having a Gaussian profile and a pulsed beam 14 formed of a series of pulses A' having a Laguerre-Gaussian profile, the pulsed excitation/illumination light beam 24 includes interleaved solid and donut-shaped pulses, as shown, propagating in the single pulsed beam 24.

To ensure the desired characteristics of the excitation/illumination light beam 24, one or both of the first and second light paths 4, 6, upstream of the beam combiner 22 can include other relay optics as are known in the art. For instance, the point spread functions of the first pulsed beam 14 and the second pulsed beam 16 can be characterized and adjusted as necessary so as to exhibit desired diameters. In addition, the first and second pulsed beams 14, 16 can be overlapped and their powers balanced in the multiplexed excitation/illumination light beam 24.

The multiplexer 2 is located in optical communication with a confocal microscope 26 such that the excitation/illumination light beam 24 including the interleaved pulses of different profiles can be directed to a sample and examined by use of the confocal microscope 26, e.g., a scanning confocal microscope. The multiplexer 2 can be an integral part of a confocal microscope or alternatively can be a modification that can be added to a confocal microscope.

By way of example and without limitation, a system can include a confocal microscope 26 and a multiplexer 2 and the confocal microscope can include standard components such as at least one scanning member that can alter the angle of illumination of a sample, an objective lens that can be employed to guide the excitation/illumination light beam 24 to a sample held by the confocal microscope 26, and at least one lens for imaging the light from the sample body to a detector 28. In addition, depending upon the nature of the light beam 24 and the sample, the light from the sample can be reflected and/or emitted from the sample body as is known.

At the confocal microscope 26, the interleaved pulses of the excitation/illumination light beam 24 can excite an emission and/or simply be reflected from the sample, and in response to the light beam 24 the sample can generate a stream of optical output pulses. The optical output from the sample can be generated in any known fashion. For instance, in one embodiment the optical output can be a reflection from the sample. In another embodiment, the light beam 24 can stimulate an optical emission from a sample. For instance, the wavelength of the pulses of the light beam 24 can be selected so as to stimulate an autofluorescent emission from a sample. In this embodiment, the inclusion of a fluorescent dye in the sample may not be necessary. However, in other embodiments, it may be preferred to dye a sample, in which case the light beam 24 can be designed to stimulate a detectable optical emission from the sample. As the excitation/illumination light beam 24 includes a series of interleaved pulses of differing profiles that propagate as the single beam 24, the light beam generated at the sample can likewise include a series of differing pulse profiles that reflect the interleaved pulse train of the excitation/illumination light beam 24.

The confocal microscope can include a detector 28 that can be any suitable photodetector (e.g., a photomultiplier tube) that can capture and/or record the optical pulse beam generated from excitation of the sample. In general, the detector 28 can incorporate a photomultiplier that can detect photons of the pulse beam from the sample held in the confocal microscope 26 and convert the detected photons to an electronic signal 27 that includes interleaved response pulses that correlated to the interleaved optical pulses generated at the sample by the optical excitation/illumination beam 24. As stated previously, the pulse repetition rate of the light beam 24 will be double that of the source light beam 8. As such, and depending upon the specific characteristics of a system, it may be necessary to incorporate a detector 28 with a fast temporal response, for example a microchannel plate photomultiplier tube, that can accurately acquire the signal from each of the interleaved optical pulses generated at a sample. In those embodiments in which a device is developed for addition to a pre-existing confocal microscope, the device may thus include a high speed data acquisition detector 28 for replacement of the detector of the confocal microscope that is being modified to include the disclosed device.

In addition to the multiplexer 2 and a confocal microscope 26 that includes a suitable detector 28, a system as disclosed herein can include a signal processing unit 3 that can be used to form a high-resolution image 30 from data contained in the signal 27. The signal processing unit 3 can include a demultiplexer 29, an analog to digital converter 36, and data processing software 34 that can function, optionally in conjunction with other electronic signal processing components as are known in the art, to provide a high-resolution image of a sample examined by use of a confocal microscope 26.

At the signal processing unit 3, pulsed electronic signal 27 generated at the sample and acquired by the detector 28 can be divided by the demultiplexer 29 into two analog output channels 31, 32 that represent the sample response to the two different profiles of the first and second pulsed beams 14, 16. The demultiplexer 29 can utilize generally known demultiplexing techniques to separate the two signals 31, 32. For example, the demultiplexer 29 can be a programmable demultiplexer that is under the control of the a programmable clock signal so as to be timed at half the pulse repetition rate of the excitation/illumination light beam 24, which is equivalent to the pulse rate of the pulsed source 10 and the pulsed source light beam 8. A timing signal for the demultiplexer can be provided/controlled directly by the laser system. In another embodiment, the controlling timing signal can be generated by use of a photodiode that can sense the pulsed laser output. In one embodiment, the demultiplexer can be a high speed data acquisition system equipped with a high enough sampling rate to enable direct acknowledgment of all pulses generated at the sample and separation of adjacent pulses to two digitally assigned data sequences.

The output channels 31, 32 of the demultiplexer 29 can carry analog signals reflecting the different interleaved profiles of the excitation and emission beams. Following demultiplexing, the output channels 31, 32 can be fed to an analog-to-digital converter 36 and the digital signals thus formed can be processed by use of data processing software 34 to carry out pulse-to-pulse subtraction of neighboring pulse pairs as indicated schematically at 35 to yield a processed signal. This processed signal can then be utilized to form an image of a sample as in a typical confocal laser scanning microscope by use of control software as is known in the art.

As shown at 35, the processed signal represents the subtraction of the sample response to the two optical profiles B, A' of the first and second pulsed beams 14, 16 that together formed the excitation/illumination beam 24. Thus, the subtraction result exhibits a shrunken point spread function and can provide improved spatial resolution of the subsequently formed image 30. The pulse-to-pulse subtraction of signals carried out in a signal processing unit is carried out in the time domain, and as such, differs from direct subtraction in the spatial domain that has been carried out in other previously known confocal microscopy approaches. Intuitively, as the excitation intensities of two laser profiles (e.g., Gaussian and Laguerre-Gaussian) can be the same on the edge areas, performing pulse-to-pulse subtraction of the corresponding signals in the time domain can yield a reduced signal profile and thus can greatly improve the resolution of images formed by use of the processed signals.

FIG. 2 graphically illustrates results that can be obtained through utilization of a signal processing unit 3 as described herein. In the example illustrated in FIG. 2, a Gaussian profile 40 can be utilized as one of the profiles of the excitation/illumination light beam 24 and a Laguerre-Gaussian profile 42 can be utilized as the other of the excitation/illumination light beam 24. During use, an optical signal generated at a sample by each pulse is acquired by the detector 28 and by use of the signal processing unit 3, pulse-to-pulse subtraction is performed between each pair of neighboring pulses, e.g., the sample response generated by a solid shaped pulse minus the sample response generated by a doughnut shaped pulse. Using the data processing software 34 operation to "deduct" the signal generated in the region of the doughnut shaped light field 42 from that of the solid-shaped light field, the resulting deduction profile 44 is obtained.

The resolution of a system can depend on the size of the profiles, e.g., upon the size of the hole in the center of a doughnut-shaped profile. For instance, in the illustrated embodiment the solid beam is described with Gaussian profile and the doughnut-shaped beam can be a Laguerre-Gaussian profile:

$$\text{Gaussian profile: } I_G(r) = I_{G0} e^{-\frac{2r^2}{\omega_G^2}} \quad (1)$$

$$\text{Laguerre-Gaussian profile: } I_D(r) = I_{D0} r^2 e^{-\frac{2r^2}{\omega_G^2}} \quad (2)$$

in which $I_{G0}$ and $I_{D0}$ are the focus intensity of Gaussian and Laguerre-Gaussian beam respectively, $\omega_G$ and $\omega_D$ are the radius of beam waist of the two types of beams and $r=\sqrt{x^2+y^2}$ is the radius coordinate.

As shown in FIG. 2, it is possible to acquire approximately 2 times improvement by use of the interleaved beam and the subtraction processing as compared to the use of a Gaussian profile beam alone. As illustrated, the expected resolution (R) of an image can be approximately $0.21\lambda$ (i.e., the wavelength of the source light beam 8) by use of disclosed methods ($R_{PED}$) versus $0.44\lambda$ in standard confocal microscopy ($R_{confocal}$).

Moreover, further processing of a signal as is known in the art can be carried out. For example, with further deconvolution processing, approximately even further improvement of the resolution can be obtained.

By use of disclosed systems, super-resolution microscopy can be achieved with normal or even fast imaging speed and a reduction in the bleaching effect. In principle, recorded data can instantly capture an event. Moreover, there is no special requirements of laser wavelength or high laser power and thus the approach is widely applicable in biological imaging. Moreover, due to the use of lower power and short pulses for excitation/illumination, disclosed methods and systems can be highly beneficial in imaging biological samples. Overall, disclosed systems and methods can be a widely applicable tool for live-cell superresolution imaging and can provide biologists new capability to image in-situ life process on molecular level with minimal interference while freeing them in the experimental design with a choice of dye presence or absence and, when present, a choice in dye. This can enlarge the demand of super resolution microscopes and promotes biological research with live-cell super-resolution imaging.

While certain embodiments of the disclosed subject matter have been described using specific terms, such description is for illustrative purposes only, and it is to be understood that changes and variations may be made without departing from the spirit or scope of the subject matter.

What is claimed is:

1. An optical microscopy device comprising:
a multiplexer, the multiplexer comprising a beam splitter and a beam combiner, a first light path having a first length and a second light path having a second length being defined between the beam splitter and the beam combiner, the first length differing from the second length, the beam combiner being configured for combining a first light beam of the first light path with a second light beam of the second light path to form an excitation/illumination beam, the beam combiner being configured for location in optical communication with a sample, the multiplexer further comprising a phase plate located in one of the first light path and the second light path, the phase plate modifying a profile of either the first light beam or the second light beam; and
a signal processing unit configured for processing a signal generated by the sample in response to the excitation/illumination beam, wherein the signal processing unit comprises data processing software configured to carry out pulse-to-pulse subtraction of neighboring pulse pairs of the signal, the signal including a series of pulses comprising interleaved pulses of different profiles.

2. The optical microscopy device of claim 1, the signal processing unit further comprising a demultiplexer and an analog to digital converter.

3. The optical microscopy device of claim 2, the signal processing unit comprising a programmable clock, the programmable clock controlling the demultiplexer.

4. The optical microscopy device of claim 1, wherein at least one of the first length and the second length is adjustable.

5. The optical microscopy device of claim 1, wherein the phase plate comprises an optical phase modulation device.

6. The optical microscopy device of claim 5, wherein the optical phase modulation device comprises at least one of an optical vortex phase plate and spatial light modulator.

7. The optical microscopy device of claim 1, further comprising a photodetector in electrical communication with the signal processing unit.

8. The optical microscopy device of claim 7, wherein the photodetector comprises a photomultiplier.

9. The optical microscopy device of claim 8, wherein the photomultiplier comprises a fast photomultiplier tube.

10. The optical microscopy device of claim 1, further comprising a confocal microscope in optical communication with the multiplexer and in electronic communication with the signal processing unit.

11. A method for examining a sample comprising:
directing a pulsed source light beam to a beam splitter to form a first pulsed beam traveling on a first light path and a second pulsed beam traveling on a second light path, the first light path having a first length and the second light path having a second length, the first and second lengths differing from one another;
modifying a profile of one of the first pulsed beam and the second pulsed beam to form a modified pulsed beam, the other of the first pulsed beam and the second pulsed beam being unmodified;
combining the modified pulsed beam and the unmodified pulsed beam to form a third pulsed beam that includes pulses of the modified pulsed beam interleaved with pulses of the unmodified pulsed beam;
directing the third pulsed beam at a sample, the sample thereby generating a response pulsed beam;
deducting components of the response pulsed beam from one another to form a processed signal; and
forming an image of the sample by use of the processed signal.

12. The method of claim 11, further comprising demultiplexing the response pulsed beam to form first and second analog signals and converting the first and second analog signals to digital signals prior to deducting components of the response pulsed beam from one another.

13. The method of claim 11, wherein the pulsed source light beam defines a profile that focuses to a solid spot.

14. The method of claim 11, wherein the profile of the modified pulsed beam defines a profile that focuses to a circular profile surrounding a dark center.

15. The method of claim 11, wherein a difference between the first length and the second length provides a delay in pulses of one of the first pulsed beam or the second pulsed beam such that the pulses of the first pulsed beam and the pulses of the second pulsed beam are temporally shifted relative to one another.

16. The method of claim 15, wherein the pulses of the first pulsed beam and the pulses of the second pulsed beam are temporally shifted relative to one another by about one-half of a pulse repetition cycle.

17. The method of claim 11, wherein the response pulsed beam comprises a fluorescent response of the sample.

18. The method of claim 17 wherein the fluorescent response comprises an autofluorescent response of the sample.

19. The method of claim 11, wherein the sample is a biological sample comprising live or fixed cells.

20. An optical microscopy device comprising:
a multiplexer, the multiplexer comprising a beam splitter and a beam combiner, a first light path having a first length and a second light path having a second length being defined between the beam splitter and the beam combiner, the first length differing from the second length, the beam combiner being configured for combining a first light beam of the first light path with a second light beam of the second light path to form an excitation/illumination beam, the beam combiner being configured for location in optical communication with a sample, the multiplexer further comprising a phase plate located in one of the first light path and the second light path, the phase plate comprising at least one of an optical vortex phase plate and a spatial light modulator, the phase plate modifying a profile of either the first light beam or the second light beam; and
a signal processing unit, wherein the signal processing unit comprises data processing software configured to deduct signal components from one another, the signal components being components of a signal generated by the sample in response to the excitation/illumination beam.

* * * * *